United States Patent
Sridharan et al.

(10) Patent No.: US 10,587,185 B1
(45) Date of Patent: Mar. 10, 2020

(54) DYNAMIC CARRIER WAVEFORM MODIFICATION TO AVOID CONCURRENT TURN-ON/TURN-OFF SWITCHING

(71) Applicant: Ford Global Technologies, LLC, Dearborn, MI (US)

(72) Inventors: Srikanthan Sridharan, Dearborn, MI (US); Jun Kikuchi, Novi, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 0 days.

(21) Appl. No.: 16/386,037

(22) Filed: Apr. 16, 2019

(51) Int. Cl.
*H02M 1/38* (2007.01)
*H02P 27/14* (2006.01)
*H02M 7/48* (2007.01)
*H02M 3/158* (2006.01)
*H02M 1/00* (2006.01)

(52) U.S. Cl.
CPC .............. *H02M 1/38* (2013.01); *H02M 3/158* (2013.01); *H02M 7/48* (2013.01); *H02P 27/14* (2013.01); *H02M 2001/008* (2013.01)

(58) Field of Classification Search
CPC .............. H02M 1/38; H02M 2001/385; H02M 2001/0029; H02M 2001/0038; H02M 7/527; H02M 3/158; H02M 7/48; H02M 2001/008; H02P 27/14
See application file for complete search history.

(56) References Cited

U.S. PATENT DOCUMENTS

| | | | |
|---|---|---|---|
| 6,411,530 | B2 | 6/2002 | Hammond et al. |
| 6,819,077 | B1 * | 11/2004 | Seibel ............... H02M 7/53873 318/799 |
| 7,327,181 | B2 | 2/2008 | Hussein |
| 8,680,794 | B2 | 3/2014 | Kazama et al. |
| 9,853,544 | B2 | 12/2017 | Govindaraj et al. |
| 2005/0174076 | A1 * | 8/2005 | Katanaya .......... H02M 7/53873 318/400.28 |
| 2008/0265831 | A1 * | 10/2008 | Imai ........................ H02P 21/06 318/801 |
| 2015/0349639 | A1 * | 12/2015 | Hosoyama ............ H02M 3/158 323/271 |

* cited by examiner

*Primary Examiner* — Alex Torres-Rivera
(74) *Attorney, Agent, or Firm* — David B. Kelley; Brooks Kushman P.C.

(57) ABSTRACT

A power electronics switching system has a power converter including switching elements respectively disposed in parallel paths. The system also has a controller that outputs switching commands for the switching elements derived from carrier waveforms and reference waveforms corresponding to the switching elements, and generates a shape for one of the carrier waveforms according to a difference in magnitudes between the reference waveforms such that the shape is of a first type responsive to the difference being greater than a first threshold and is of a second type different than the first type responsive to the difference being less than a second threshold.

19 Claims, 7 Drawing Sheets

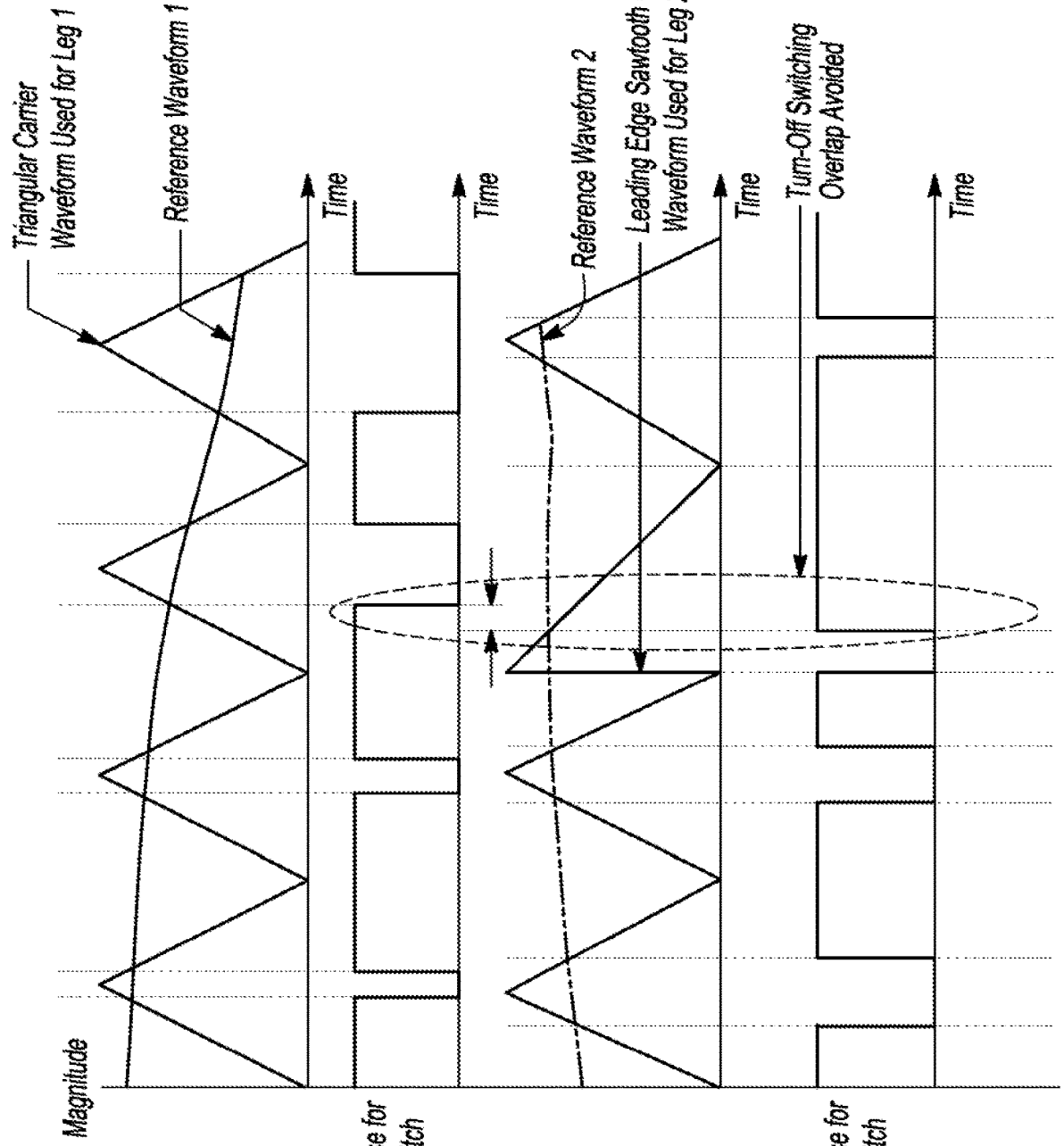

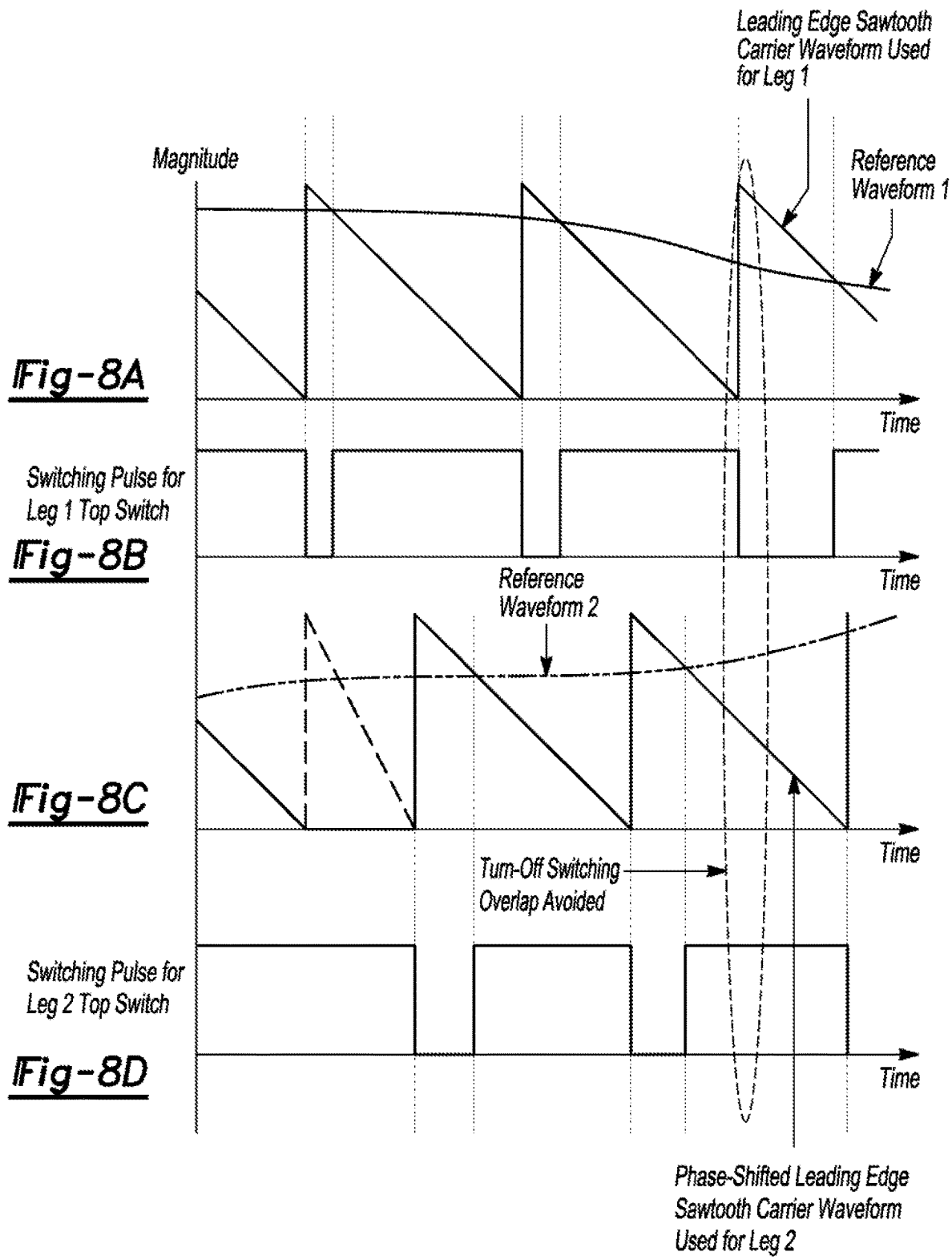

DYNAMIC CARRIER WAVEFORM MODIFICATION TO AVOID CONCURRENT TURN-ON/TURN-OFF SWITCHING

TECHNICAL FIELD

This disclosure relates to the control of power semiconductor devices.

BACKGROUND

Power semiconductors are used as switches or rectifiers in certain power electronics, such as switch-mode power supplies. They are also called power devices or, when used in integrated circuits, power integrated circuits (ICs). A power semiconductor is usually used in commutation mode (it is either on or off), and has a design optimized for such usage. Power semiconductors are found in systems delivering tens of milliwatts (e.g., a headphone amplifier) and in systems delivering a gigawatt (e.g., a high voltage direct current transmission line).

Certain metal-oxide-semiconductor field-effect transistors (MOSFETs), a type of power semiconductor, are depletion channel devices: Voltage, not current, may be necessary to create a conduction path from drain to source. At low frequencies, this can reduce gate current because it is only required to charge gate capacitance during switching. Switching times range from tens of nanoseconds to a few hundred microseconds. Typically, MOSFET devices are not bi-directional and are not reverse voltage blocking.

An insulated-gate bipolar transistor (IGBT), another type of power semiconductor, often has characteristics common to bipolar junction transistors (BJTs) and MOSFETs. It may have a high gate impedance and thus low gate current requirements like a MOSFET. It may also have a low on state voltage drop in the operating mode like a BJT. Certain IGBTs can be used to block both positive and negative voltages, and have reduced input capacitance compared to MOSFET devices.

SUMMARY

A power electronics switching system has a power converter including switching elements respectively disposed in parallel paths, and a controller. The controller outputs switching commands for the switching elements derived from periodic carrier waveforms and reference waveforms corresponding to the switching elements, and responsive to a difference in magnitudes of the reference waveforms falling below a predetermined threshold, alters a shape of one of the periodic carrier waveforms to prevent simultaneous switching of the switching elements.

A power electronics switching system has a power converter including switching elements respectively disposed in parallel paths, and a controller. The controller outputs switching commands for the switching elements derived from carrier waveforms and reference waveforms corresponding to the switching elements, and generates a shape for one of the carrier waveforms according to a difference in magnitudes between the reference waveforms such that the shape is of a first type responsive to the difference being greater than a first threshold and is of a second type different than the first type responsive to the difference being less than a second threshold.

A method for controlling a power electronics switching system includes outputting switching commands for switching elements respectively disposed in parallel paths. The switching commands are derived from periodic carrier waveforms and reference waveforms corresponding to the switching elements. The method also includes, responsive to a difference in magnitudes of the reference waveforms falling below a predetermined threshold, altering a phase of one of the periodic carrier waveforms to prevent simultaneous switching of the switching elements.

BRIEF DESCRIPTION OF THE DRAWINGS

FIGS. 6A and 6C are plots of first and second carrier and reference waveform magnitudes versus time, respectively.

FIGS. 6B and 6D are plots of first and second switching pulse magnitudes associated with the waveforms of FIGS. 6A and 6C versus time, respectively.

FIGS. 8A and 8C are plots of first and second carrier and reference waveform magnitudes versus time, respectively.

FIGS. 8B and 8D are plots of first and second switching pulse magnitudes associated with the waveforms of FIGS. 8A and 8C versus time, respectively.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

In a multi-leg power converter or multiple power converters connected to a common DC-bus, whenever turn-on (turn-off) instants in semiconductor switches in two different legs are overlapping (simultaneous switching), higher voltage spikes result across the semiconductor devices than when respective turn-on (turn-off) instants are not overlapping.

Figure 1:
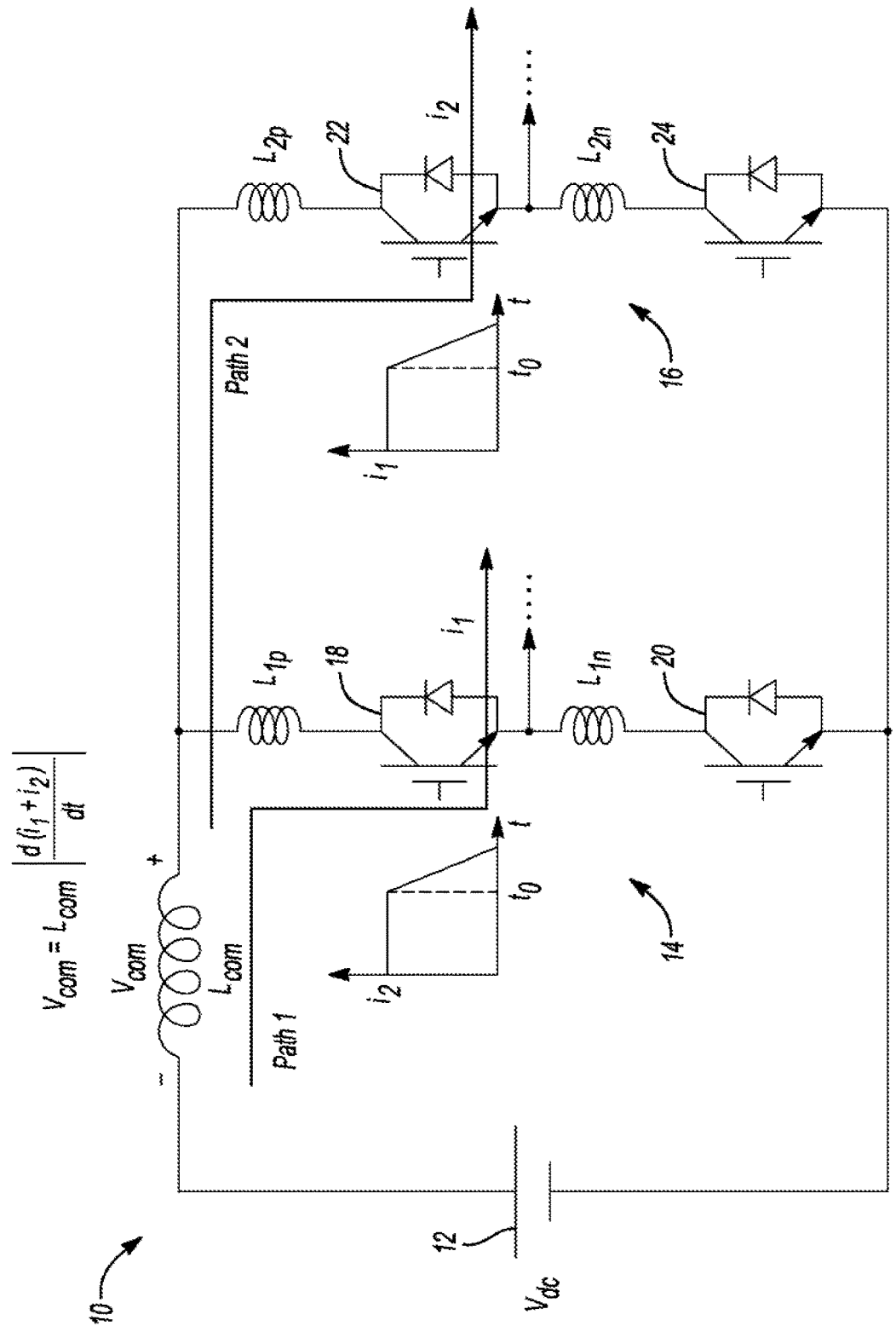
FIG. 1 is a schematic diagram of a power system.

Referring to FIG. 1 for example, a power system 10 includes a traction battery 12 and a pair of legs 14, 16 in parallel with the traction battery 12. The leg 14 includes semiconductor switches 18, 20 in series. The leg 16 includes semiconductor switches 22, 24 in series. The associated parasitic inductances $L_{com}$, $L_{1p}$, $L_{1n}$, $L_{2p}$, $L_{2n}$ are also shown. In such a system, whenever turn-on (turn-off) instants in switching in the legs 14, 16 overlap (simultaneous switching), higher voltage spikes result across the semiconductor devices than when respective turn-on (turn-off) instants are not overlapping. For example, when the turn-off instants for the semiconductor switches 18, 22 overlap, higher voltage spikes result across the semiconductor switches 18, 22 than when the turn-off instants do not overlap. The combined instantaneous change in current (di/dt) flowing through the parasitic inductance $L_{com}$ common to the legs 14, 16 during simultaneous switching $(d(i_1+i_2)dt)$ is higher than when not, resulting in higher voltage $V_{com}$ across the parasitic inductance $L_{com}$, as indicated in FIG. 1. This additional overvoltage spike can result in issues for a device incapable of withstanding such a voltage, leading to selection of devices with higher withstand voltages, potentially increasing cost and/or volume.

Figure 2:
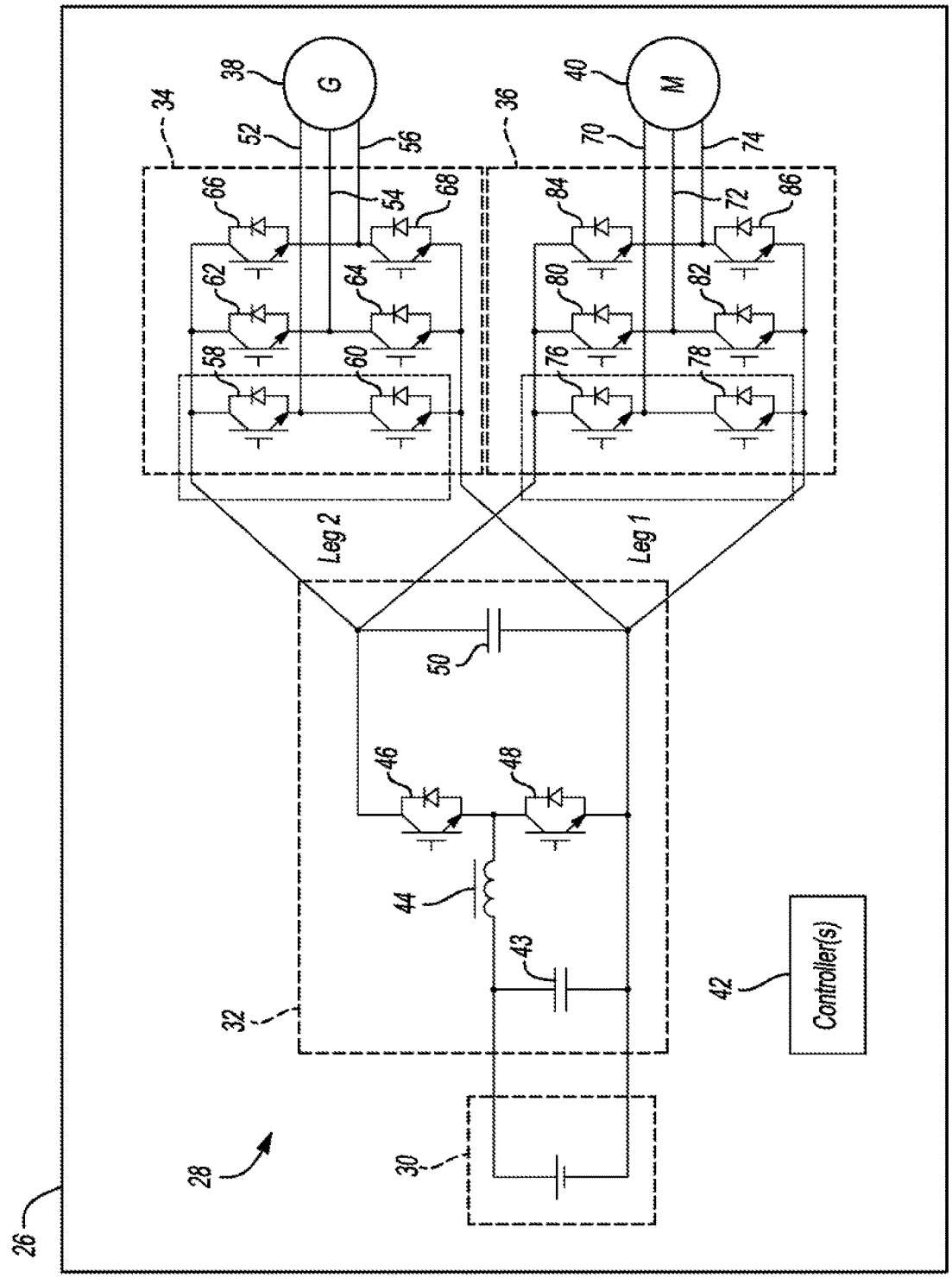
FIG. 2 is a schematic diagram of a power system of a vehicle.

The above also applies to multiple power converters connected to a common DC-bus. Referring to FIG. 2 for example, a vehicle 26 includes a power system 28. The power system 28 includes a traction battery 30, a DC-DC converter 32, a pair of inverters 34, a generator 38, a motor 40, and a controller(s) 42. The DC-DC converter includes a capacitor 43, an inductor 44, a pair of semiconductor switches 46, 48 in series, and a DC-link capacitor 50. The inverter 34 includes phase legs 52, 54, 56 in parallel with each other and the DC-link capacitor 50. The phase leg 52 includes semiconductor switches 58, 60 in series. The phase leg 54 includes semiconductor switches 62, 64 in series. And the phase leg 56 includes semiconductor switches 66, 68 in series. Likewise, the inverter 36 includes phase legs 70, 72, 74 in parallel with each other and the DC-link capacitor 50. The phase leg 70 includes semiconductor switches 76, 78 in series. The phase leg 72 includes semiconductor switches 80, 82 in series. And the phase leg 74 includes semiconductor switches 84, 86 in series.

Power generated by the generator 38 may be transformed from AC to DC by the inverter 34 and bucked by the DC-DC converter for delivery to the traction battery 30. Power from the traction battery 30 may be boosted by the DC-DC converter 32 and transformed from DC to AC by the inverter 36 for delivery to the motor 40. The controller(s) 42 is in communication with and controls operation of the traction battery 30, DC-DC converter 32, inverters 34, 36, generator 38, and motor 40. The controller(s) 42 can also perform the algorithms/methods/processes contemplated herein.

Figure 3:
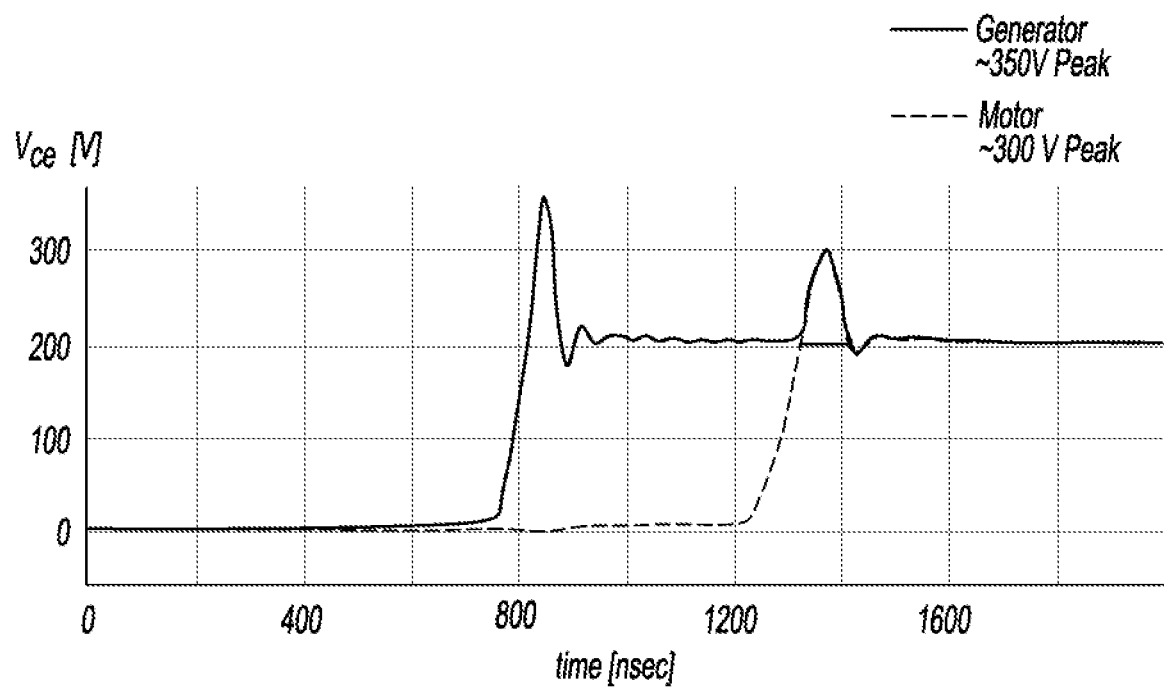
FIG. 3 is a plot of voltage versus time associated with non-overlapping switching instants for a pair of switches of FIG. 2.
Figure 4:
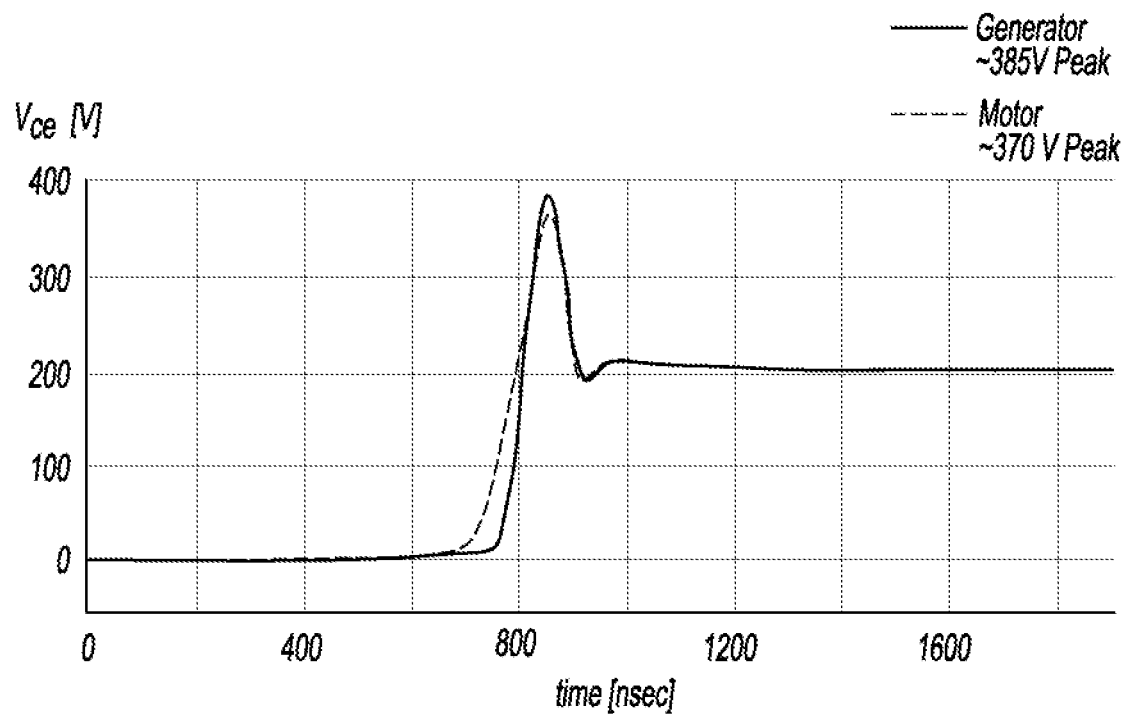
FIG. 4 is a plot of voltage versus time associated with overlapping switching instants for the pair of switches of FIG. 2.

Referring to FIGS. 2 and 3, experimental observation of voltages across the switches 58, 76 when they are not experiencing simultaneous switching reveals peak voltages of 350V and 300V respectively. Referring to FIGS. 2 and 4, experimental observation of voltages across the switches 58, 76 when they are experiencing simultaneous switching reveals peak voltages of 385V and 370V respectively.

Figures 5A, 5B, 5C:
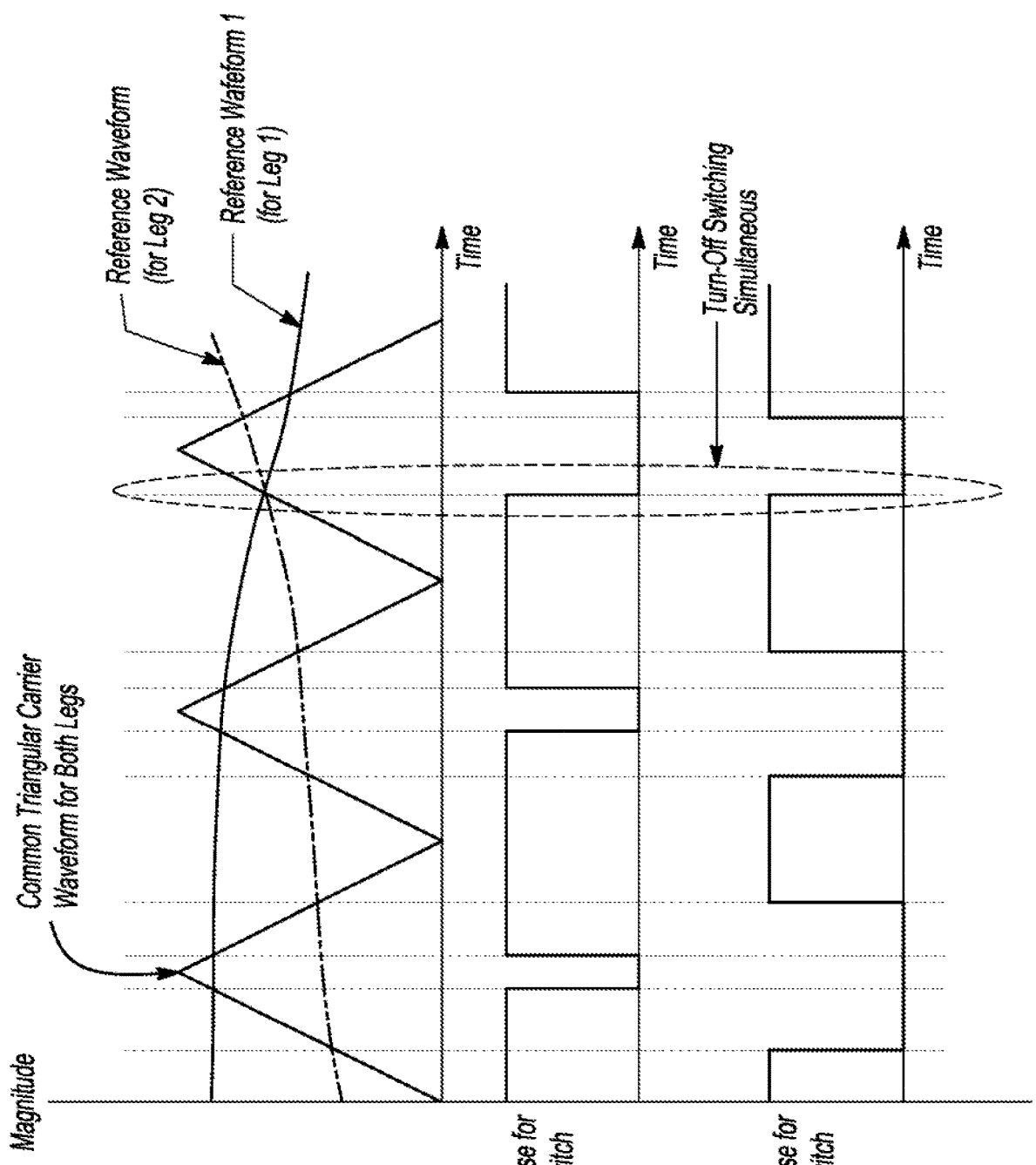
FIG. 5A is a plot of carrier and first and second reference waveform magnitudes versus time.
FIGS. 5B and 5C are plots of first and second switching pulse magnitudes associated with the waveforms of FIG. 5A versus time, respectively.
Figures 7A, 7B, 7C, 7D:
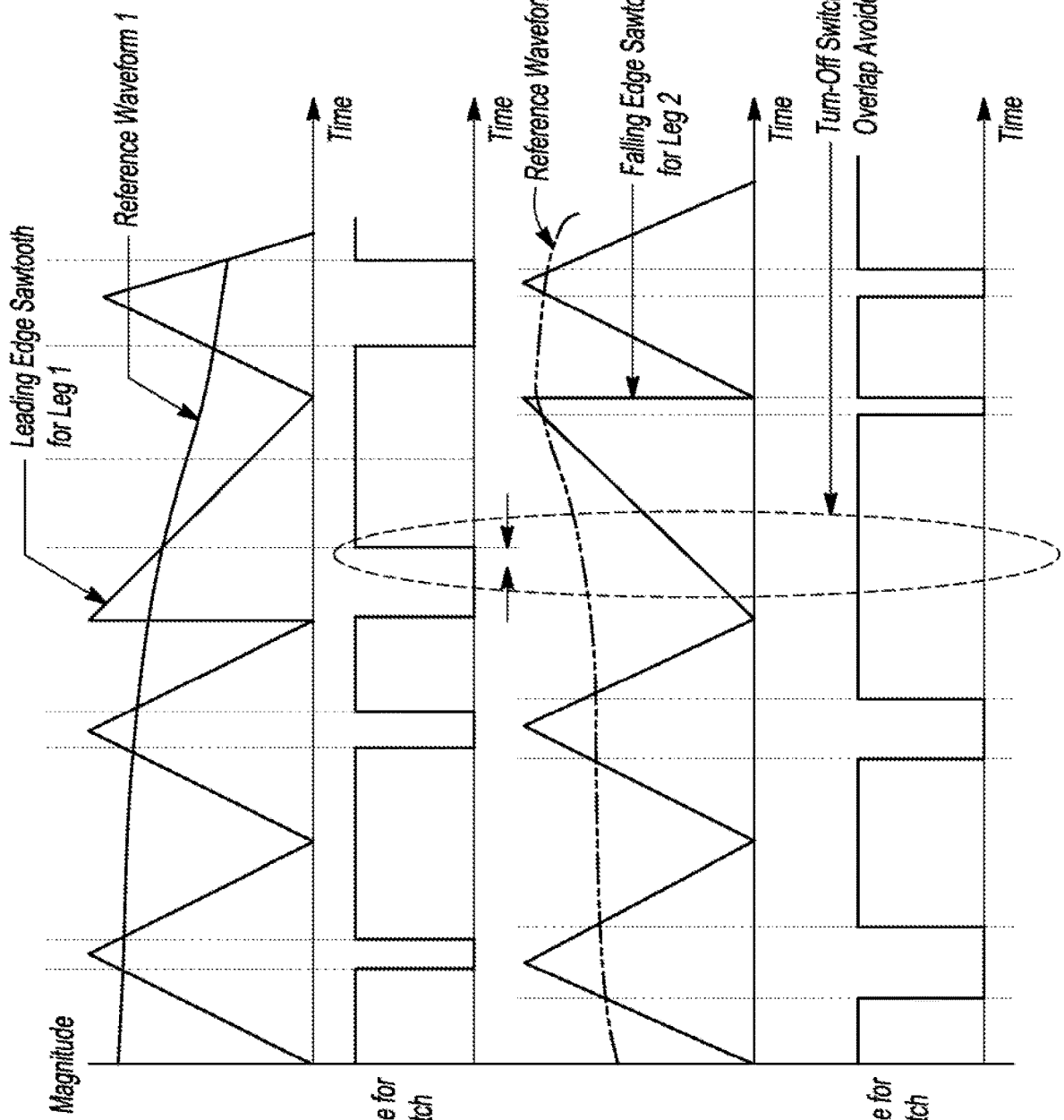
FIGS. 7A and 7C are plots of first and second carrier and reference waveform magnitudes versus time, respectively.
FIGS. 7B and 7D are plots of first and second switching pulse magnitudes associated with the waveforms of FIGS. 7A and 7C versus time, respectively.

Referring to FIGS. 5A through 5C, the switching signals generated by a controller to semiconductor switching devices are generated as a result of comparison between the modulation (reference) waveform and the carrier waveform. If the value of the modulation waveform for a leg is greater than the carrier waveform, the switching pulse for the corresponding top switch of that leg is in high state, otherwise in low state. An example of simultaneous turn-off switching instants is depicted when the reference waveforms have the same value.

Here, we propose to avoid occurrence of switching overlaps between semiconductor devices in parallel legs by intentionally shifting the instant of switching of one of the devices involved in simultaneous switching either in a dynamic (on-the-fly) or pre-programmed fashion, using alteration of one or more properties of the carrier, such as its waveform, phase, frequency, amplitude or slope. The parallel legs may be in a same power converter or different power converters for various types of vehicle and non-vehicle power systems.

Referring to FIGS. 6A through 6D, an example of dynamic carrier waveform alteration is shown. Triangular waveforms are used under normal operation. Whenever a potential simultaneous switching event is anticipated because a difference in magnitude between the reference waveforms falls below a threshold, one of the carrier waveforms (e.g., waveform 2) is dynamically altered from the triangular shape to the sawtooth shape with same frequency and with the leading edge of the sawtooth positioned at the valley point of the triangular carrier waveform of FIG. 6A. The threshold can be selected based on simulation/testing results and application requirements. This ensures that the turn-off event in the second leg strictly happens at the leading edge of the sawtooth waveform, avoiding simultaneous turn-off due to concurrent valley point of the triangular carrier of FIG. 6A. The carrier waveform for the second leg can be restored from sawtooth to the original triangular geometry once the simultaneous switching event is overcome, upon completion of one carrier waveform cycle, after a predetermined period of time, or responsive to the difference in magnitude between the reference waveforms exceeding some threshold, which may be different from the threshold used to trigger the change. A forced turn-off imposed at the appropriate instant on the second leg effectively avoids turn-off switching overlap.

Referring to FIGS. 7A through 7D, instead of changing only one of the carrier waveforms, both carrier waveforms can be altered. Both carrier waveforms for the first and second legs are changed from triangle to leading edge and falling edge sawtooth, respectively. The turn-off events in the top switches of both the legs are thus separated by one sawtooth time period.

Referring to FIGS. 8A through 8D, the phase of one (or both) of the carrier waveforms can be altered. Responsive to a difference in magnitude between the reference waveforms falling below a threshold value, one of the carrier waveforms can be caused to have a zero-frequency dwell time or have a different switching frequency (dashed line) for some time period before returning to the original switching frequency.

Instead of dynamic alteration of one or both of the carrier waveforms to avoid simultaneous switching, the carrier waveforms can be pre-programmed by generating fixed carrier geometries that will always prevent undesired simultaneous switching events. As an example, using leading edge sawtooth carrier waveforms but phase-shifted by, for example, half the time period from each other, the leading edges (and hence the turn-off switching) of both waveforms occur separated by the given phase-shift. A similar example can be shown using phase-shifted falling edge carrier waveforms.

Using edge-synchronized leading and falling-edge sawtooth carrier waveforms, simultaneous turn-off and simultaneous turn-on events can be avoided between the switching legs. Although the use of edge-synchronization results in the turn-on in one-leg and turn-off in the other leg at the same instant, the overvoltage spike is not as large as in the case of simultaneous turn-on or turn-off in both the legs. In fact, the use of edge-synchronization in this case may have a beneficial effect of reducing the overvoltage spike because of the opposing di/dt nature in the switching current waveforms in the two legs.

Other properties of the carrier waveform, including but not limited to frequency, amplitude, and slope can also be modified in order to avoid switching overlap occurrence. Although in the above examples, triangular and sawtooth carrier waveform modifications have been shown for simplicity and ease of understanding, other waveforms are also contemplated. Carrier modification schemes can also be developed to combine other benefits, in addition to switching overlap avoidance. Introducing random variation of carrier frequencies to one or both waveforms within an allowable range, for example, may also be beneficial in achieving improved noise, vibration, and harshness performance.

The algorithms, processes, methods, logic, or strategies disclosed may be deliverable to and/or implemented by a processing device, controller, or computer, which may include any existing programmable electronic control unit or dedicated electronic control unit. Similarly, the algorithms, processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The algorithms, processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power electronics switching system comprising:
   a power converter including switching elements respectively disposed in parallel paths; and
   a controller programmed to
   output switching commands for the switching elements derived from periodic carrier waveforms and reference waveforms corresponding to the switching elements, and
   responsive to a difference in magnitudes of the reference waveforms falling below a predetermined threshold, alter a shape of one of the periodic carrier waveforms to prevent simultaneous switching of the switching elements.

2. The power electronics switching system of claim 1, wherein the one of the periodic carrier waveforms has a first shape prior to the altering and a second shape after the altering, and wherein the controller is further programmed to, responsive to completion of a cycle of the one of the periodic carrier waveforms with the second shape, return the one of the carrier waveforms to the first shape.

3. The power electronics switching system of claim 2, wherein the first shape is one of triangular and sawtooth and the second shape is the other of triangular and sawtooth.

4. The power electronics switching system of claim 1, wherein the one of the carrier waveforms has a first shape prior to the altering and a second shape after the altering, and wherein the controller is further programmed to, responsive to the difference exceeding a second predetermined threshold, return the one of the carrier waveforms to the first shape.

5. The power electronics switching system of claim 4, wherein the first shape is one of triangular and sawtooth and the second shape is the other of triangular and sawtooth.

6. The power electronics switching system of claim 1, wherein the periodic carrier waveforms have a same shape prior to the altering.

7. The power electronics switching system of claim 1, wherein the periodic carrier waveforms have a same phase.

8. The power electronics switching system of claim 1, wherein the parallel paths are electrically connected with, and define different phases of, one or more electric machines.

9. A power electronics switching system comprising:
   a power converter including switching elements respectively disposed in parallel paths; and
   a controller programmed to
   output switching commands for the switching elements derived from carrier waveforms and reference waveforms corresponding to the switching elements, and
   generate a shape for one of the carrier waveforms according to a difference in magnitudes between the reference waveforms such that the shape is of a first type responsive to the difference being greater than a first threshold and is of a second type different than the first type responsive to the difference being less than a second threshold.

10. The power electronics switching system of claim 9, wherein the first type is one of triangular or sawtooth and the second type is the other of triangular or sawtooth.

11. The power electronic switching system of claim 9, wherein the carrier waveforms have a same phase.

12. The power electronics switching system of claim 9, wherein the first and second thresholds are same.

13. The power electronics switching system of claim 9, wherein the parallel paths are electrically connected with, and define different phases of one or more electric machines.

14. A method for controlling a power electronics switching system, comprising:

outputting switching commands, for switching elements respectively disposed in parallel paths, derived from periodic carrier waveforms and reference waveforms corresponding to the switching elements; and responsive to a difference in magnitudes of the reference waveforms falling below a predetermined threshold, altering a phase of one of the periodic carrier waveforms to prevent simultaneous switching of the switching elements.

15. The method of claim 14, wherein the one of the periodic carrier waveforms has a first phase prior to the altering and a second phase after the altering, further comprising, responsive to completion of a cycle of the one of the periodic carrier waveforms with the second phase, return the one of the carrier waveforms to the first phase.

16. The method of claim 14, wherein the one of the carrier waveforms has a first phase prior to the altering and a second phase after the altering, further comprising, responsive to the difference exceeding a second predetermined threshold, return the one of the carrier waveforms to the first phase.

17. The method of claim 14, wherein the carrier waveforms prior to the altering have a same shape.

18. The method of claim 17, wherein the shape is triangular prior to the altering.

19. The method of claim 17, wherein the shape is sawtooth prior to the altering.

* * * * *